(12) United States Patent
Aronson et al.

(10) Patent No.: US 7,882,193 B1
(45) Date of Patent: *Feb. 1, 2011

(54) APPARATUS AND METHOD FOR WEIGHTED AND AGING SPAM FILTERING RULES

(75) Inventors: Daniel Alex Aronson, Berkeley, CA (US); Sunil Paul, San Francisco, CA (US); Kirpal Singh Khalsa, Sunnyvale, CA (US); Timothy Milan Pozar, San Francisco, CA (US); Art Medlar, Berkeley, CA (US)

(73) Assignee: Symantec Corporation, Mountain View, CA (US)

( * ) Notice: Subject to any disclaimer, the term of this patent is extended or adjusted under 35 U.S.C. 154(b) by 758 days.

This patent is subject to a terminal disclaimer.

(21) Appl. No.: 10/117,065

(22) Filed: Apr. 4, 2002
(Under 37 CFR 1.47)

Related U.S. Application Data

(63) Continuation of application No. 09/224,378, filed on Dec. 31, 1998, now Pat. No. 6,654,787.

(51) Int. Cl.
*G06F 15/16* (2006.01)
(52) U.S. Cl. .................. 709/207; 709/206; 709/202
(58) Field of Classification Search ......... 709/206–207, 709/217, 224, 202, 232, 238; 707/3, 10; 713/201
See application file for complete search history.

(56) References Cited

U.S. PATENT DOCUMENTS 5,377,354 A * 12/1994 Scannell et al. ............. 718/103

(Continued)

FOREIGN PATENT DOCUMENTS

| JP | 41020649 | 9/1998 |
|---|---|---|
| WO | WO 98/37680 | 8/1998 |

OTHER PUBLICATIONS

Clark, et al., PCMail: A Distributed Mail System for Personal Computers, May 1986, MIT Laboratory for computer Science, 23 pages (1-23).

(Continued)

*Primary Examiner*—Larry Donaghue
*Assistant Examiner*—Karen C Tang
(74) *Attorney, Agent, or Firm*—Meyertons, Hood, Kivlin, Kowert & Goetzel, P.C.

(57) ABSTRACT

A server is disclosed for filtering e-mail messages. The server receives requests to retrieve e-mail messages on behalf of a client and then retrieves e-mail messages from a mail server on behalf of the client. The server then filters the e-mail messages based on one or more rules and transfers the filtered e-mail messages to the client. In addition, the server continues to filter the e-mail messages after the client has disconnected from the server. In one embodiment of the invention the e-mail message recipient is sent a notification by the server indicating that messages have been filtered. The recipient is then able to scan the filtered messages and insure that the messages have been filtered correctly. In another embodiment, a third party scans the e-mail messages on behalf of the e-mail user to make this determination. Also disclosed is an e-mail filter comprising an application programming interface and a plurality of dynamically loaded rule modules adapted to interface with the API. The rule modules are activated and deactivated based on usage. Specifically, rule modules which have not been used for a predetermined period of time are deactivated. In addition, different rule modules are assigned different weighted values based on the probability that the rule module will accurately filter e-mail messages and/or on the content of the e-mail messages.

53 Claims, 8 Drawing Sheets

U.S. PATENT DOCUMENTS

| | | | |
|---|---|---|---|
| 5,438,433 A | | 8/1995 | Reifman et al. |
| 5,557,789 A | * | 9/1996 | Mase et al. .................... 707/1 |
| 5,619,648 A | | 4/1997 | Canale et al. |
| 5,634,005 A | | 5/1997 | Matsuo |
| 5,649,182 A | * | 7/1997 | Reitz ............................ 707/7 |
| 5,675,507 A | | 10/1997 | Bobo, II |
| 5,678,041 A | | 10/1997 | Baker et al. |
| 5,696,898 A | | 12/1997 | Baker et al. |
| 5,734,826 A | | 3/1998 | Olnowich et al. |
| 5,790,789 A | | 8/1998 | Suarez |
| 5,796,948 A | | 8/1998 | Cohen |
| 5,809,242 A | | 9/1998 | Shaw et al. |
| 5,822,527 A | | 10/1998 | Post |
| 5,826,022 A | * | 10/1998 | Nielsen ...................... 709/206 |
| 5,835,087 A | | 11/1998 | Herz et al. |
| 5,845,263 A | | 12/1998 | Camaisa et al. |
| 5,862,325 A | | 1/1999 | Reed et al. |
| 5,864,684 A | | 1/1999 | Nielsen |
| 5,870,548 A | | 2/1999 | Nielsen |
| 5,874,955 A | | 2/1999 | Rogowitz et al. |
| 5,884,033 A | * | 3/1999 | Duvall et al. ................ 709/206 |
| 5,889,943 A | * | 3/1999 | Ji et al. ........................ 726/22 |
| 5,905,863 A | | 5/1999 | Knowles et al. |
| 5,930,479 A | | 7/1999 | Hall |
| 5,968,117 A | | 10/1999 | Schuetze |
| 5,978,837 A | | 11/1999 | Foldare et al. |
| 5,999,932 A | | 12/1999 | Paul |
| 5,999,967 A | | 12/1999 | Sundsted |
| 6,023,700 A | | 2/2000 | Owens et al. |
| 6,023,723 A | | 2/2000 | McCormick et al. |
| 6,052,709 A | * | 4/2000 | Paul ............................ 709/202 |
| 6,073,165 A | | 6/2000 | Narashimhan et al. |
| 6,112,227 A | | 8/2000 | Heiner |
| 6,146,026 A | | 11/2000 | Ushiku |
| 6,157,630 A | | 12/2000 | Adler et al. |
| 6,158,031 A | * | 12/2000 | Mack et al. ................. 714/724 |
| 6,161,130 A | * | 12/2000 | Horvitz et al. .............. 709/206 |
| 6,173,364 B1 | * | 1/2001 | Zenchelsky et al. ......... 711/118 |
| 6,182,118 B1 | | 1/2001 | Finney et al. |
| 6,189,026 B1 | | 2/2001 | Birrell et al. |
| 6,192,360 B1 | | 2/2001 | Dumais et al. |
| 6,195,686 B1 | | 2/2001 | Moon et al. |
| 6,199,102 B1 | | 3/2001 | Cobb |
| 6,199,103 B1 | | 3/2001 | Sakaguchi et al. |
| 6,216,165 B1 | | 4/2001 | Woltz et al. |
| 6,226,630 B1 | | 5/2001 | Billmers |
| 6,230,156 B1 | | 5/2001 | Hussey |
| 6,314,454 B1 | | 11/2001 | Wang et al. |
| 6,327,610 B2 | | 12/2001 | Uchida |
| 6,334,140 B1 | | 12/2001 | Kawamata |
| 6,360,254 B1 | | 3/2002 | Linden et al. |
| 6,377,949 B1 | * | 4/2002 | Gilmour ...................... 707/10 |
| 6,411,947 B1 | * | 6/2002 | Rice et al. .................... 706/47 |
| 6,421,709 B1 | | 7/2002 | McCormick et al. |
| 6,438,608 B2 | * | 8/2002 | Biliris et al. ................ 709/245 |
| 6,505,237 B2 | | 1/2003 | Beyda et al. |
| 6,546,416 B1 | * | 4/2003 | Kirsch ........................ 709/206 |
| 6,549,957 B1 | * | 4/2003 | Hanson et al. ................. 710/5 |
| 6,571,275 B1 | * | 5/2003 | Dong et al. ................. 709/209 |
| 6,718,321 B2 | * | 4/2004 | Birrell et al. ................... 707/2 |
| 6,732,157 B1 | * | 5/2004 | Gordon et al. .............. 709/206 |
| 6,757,713 B1 | * | 6/2004 | Ogilvie et al. ............. 709/206 |
| 2002/0007301 A1 | | 1/2002 | Reuning |
| 2003/0023722 A1 | * | 1/2003 | Vinberg ...................... 709/224 |
| 2005/0081059 A1 | * | 4/2005 | Bandini et al. .............. 713/201 |

OTHER PUBLICATIONS

"Statements of Facts of Dean M. Munyon In Support of Inventorship Correction Petitions Under 37 CFR 1.47(a) and 37 CFR 1.183" submitted Dec. 18, 2009, 132 pages.

Email String Between Art Medlar and Marina Portnova and others, May-Jul. 2005, 5 pages.

Email from Art Medlar to Dean Munyon, May 4, 2009, 2 pages.

Email from Art Medlar to Samuel Shepherd, Sep. 1, 2009, 2 pages.

* cited by examiner

APPARATUS AND METHOD FOR WEIGHTED AND AGING SPAM FILTERING RULES

This application is a continuation of U.S. patent application Ser. No. 09/224,378, filed Dec. 31, 1998 now U.S. Pat. No. 6,654,787.

BACKGROUND OF THE INVENTION

1. Field of the Invention

This invention relates to the filtering of electronic mail (hereinafter "e-mail"). More particularly, the present invention relates to a method and apparatus by which dynamic filtering techniques are applied to filter out unwanted e-mail messages at various stages of transmission across one or more networks.

2. Description of the Related Art

The rapid increase in the number of users of e-mail and the low cost of distributing electronic messages via the Internet and other electronic communications networks has made marketing via the Internet an attractive medium for productivity, workflow, advertising, and business and personal communication. Consequently, e-mail and Internet newsgroups are now frequently used as the medium for widespread marketing broadcasts. These unwanted messages are commonly referred to as "spam."

Spam is more than just an annoyance to Internet users—it represents a significant threat to the stability of vast numbers of computers and networks which comprise the Internet community. Internet service providers (hereinafter "ISPs"), online services, and corporations spend millions of dollars each year attempting to control spam. In fact, some spam distributions are so large in scope that they have the ability to crash large ISP and corporate servers. One of the reasons why spam is so pervasive is that spammers require only a computer, an address list and Internet access to distribute spam to potentially millions of Internet users. In sum, if not properly controlled, spam is capable of disabling significant portions of the Internet.

There are a number of known methods for filtering spam including Realtime Blackhole List ("RBL") filtering, Open Relay Blocking System ("ORBS"); and Procmail rules and recipes. Frequently, these methods are designed to block spam from particular e-mail addresses from which spam is known to originate. For example, filtering methods used by America On Line® and Prodigy® use exclusion filters which block e-mail messages received from addresses that are suspected sources of spam. However, this approach is vulnerable to rapid changes in the source of unsolicited e-mail. Furthermore, because online services will generally not automatically block e-mail addresses from their members, these services are provided only if the user requests them.

One additional known e-mail filtering techniques are based upon an inclusion list, such that e-mail received from any source other than one listed in the inclusion list is discarded as junk. However, these methods require the user or the service provider to continually update the inclusion list manually because, like viruses, spam is constantly being modified to bypass static filters. If the inclusion list is not updated regularly, the list will quickly become outdated, resulting in the exclusion of desired e-mail messages from new sources and the continued inclusion of spam from old sources.

The Assignee of the present invention has developed improved techniques for filtering e-mail. Some of these techniques are described in related U.S. patent applications entitled UNSOLICITED E-MAIL ELIMINATOR (Ser. No. 09/006,527), and APPARATUS AND METHOD FOR CONTROLLING DELIVERY OF UNSOLICITED ELECTRONIC MAIL (Ser. No. 08/997,692).

The present application sets forth additional techniques for filtering e-mail. What is needed is an improved system and method for dynamically updating e-mail filter technology to meet the threat posed by ever-changing varieties of spam. In addition, what is needed is a system and method for filtering e-mail which can be easily implemented by the typical e-mail user. What is also needed is an anti-spam system and method which can be applied without the need to upgrade computer systems and networks currently available.

SUMMARY OF THE INVENTION

Disclosed is a server having a processor and a memory coupled to the processor, the memory having stored therein sequences of instructions which, when executed by the processor, cause the processor to perform the steps of: (1) receiving a request to retrieve e-mail messages on behalf of a client; (2) retrieving one or more e-mail messages from a mail server on behalf of the client; and (3) filtering the e-mail messages based on one or more rules to produce one or more filtered e-mail messages.

Also disclosed is a first server having a processor and a memory (e.g., machine-readable memory medium and computer-readable memory media) coupled to the processor, the memory having stored therein sequences of instructions which, when executed by the processor, cause the processor to perform the steps of: retrieving messages from a second server on behalf of a client; sorting messages into two or more groups based on one or more rules; and forwarding messages sorted into one of the groups to the client.

Also disclosed is an e-mail filter comprising an application programming interface ("API") and a plurality of rule handling filter modules adapted to interface with the API.

BRIEF DESCRIPTION OF THE DRAWINGS

A better understanding of the present invention can be obtained from the following detailed description in conjunction with the following drawings, in which.

DETAILED DESCRIPTION OF THE PREFERRED EMBODIMENT

Figure 1:
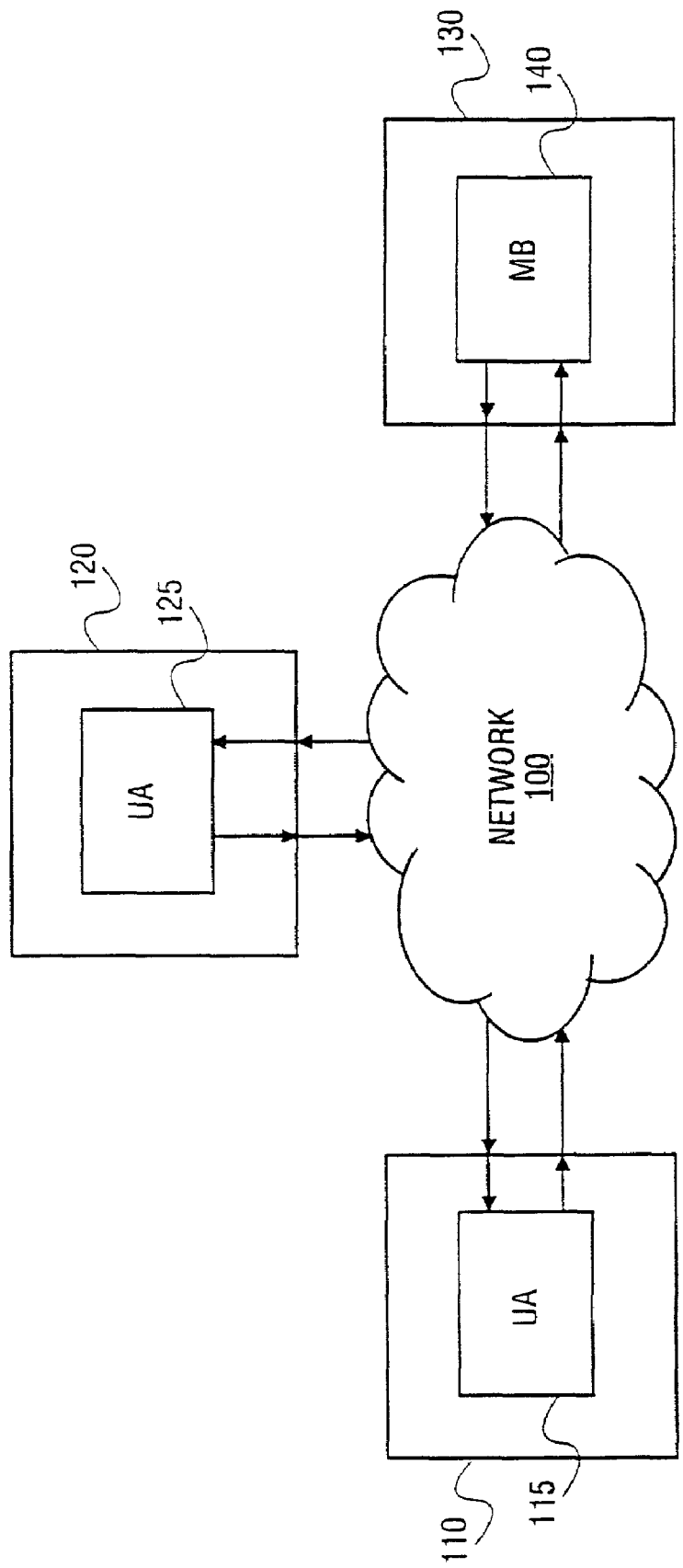
FIG. 1 illustrates generally a data network through which two clients and a server communicate.

FIG. 1 generally depicts a network 100 over which client 110, client 120, and server 130 communicate. Clients 110, 120 and mail server 130 are computers, each comprising a conventional processor and a memory with which software implementing the functionality of the present invention is executed. In one embodiment, network 100 is the Internet and clients 110, 120 and mail server 130 communicate using the well known TCP/IP protocol. In this embodiment, one or more of the clients 110, 120 may use a modem to dial out over a standard telephone line to establish a communication channel with mail server 130 over network 100. Alternatively, clients 110, 120 or mail server 130 may connect to network 100 using a digital T1 carrier or an ISDN channel. In yet another embodiment, network 100 is a local area network (hereinafter "LAN") over which clients 110, 120 or mail server 130 communicate.

Depending on the system configuration, however, one of ordinary skill in the art will readily recognize from the following discussion that different types of mail servers, clients and software could be employed without departing from the underlying principles and scope of the present invention. Accordingly, while the embodiment discussed below uses an Internet communication channel for communication between clients 110, 120 and mail server 130, numerous other communication schemes such as a direct connection to mail server 130, etc., could be implemented as well.

The following is a general description of how client 120 sends e-mail to client 110. Each client 110, 120 is capable of executing e-mail application programs, generally illustrated in FIG. 1 as user agent 115 and user agent 125. User agents 115, 125 are capable of accepting commands for composing, receiving, and replying to e-mail messages. E-mail user agents known in the art include Microsoft Outlook®, Lotus cc:mail®, Lotus Notes®, Eudora®, Novell Groupwise® and Netscape Communicator®. To send an e-mail to client 110, client 120 provides its user agent 125 with a message and a destination address. The destination address uniquely identifies client 110's mailbox 140 on mail server 130. Server 130 in this embodiment provides a message transport system (hereinafter "MTS") for receiving and storing incoming e-mail messages in mailbox 140. E-mail is sent over the Internet from client 120 to mail server 130 via a TCP connection to port 25. At the application level, the protocol used to send e-mail is usually the Simple Mail Transfer Protocol (hereinafter "SMTP").

If client 110 is connected to the same LAN as mail server 130, client 110's user agent 115 may continually check mailbox 140 (e.g., every 10 minutes) for new e-mail messages. Alternatively, client 110 may need to connect to mail server 130 by dialing out over a telephone line using a modem (i.e., either by dialing directly to mail server 130 or dialing out and connecting to mail server 130 over the Internet). This would typically be the case for a home computer user who has an account with an Internet Service Provider or online service, or a user who must dial out to connect to his corporate LAN.

For the purposes of the following discussion, when client 110 dials out to connect to mail server 130 to check mailbox 140, it communicates with mail server 130 using "Post Office Protocol 3" (hereinafter "POP3"). It should be noted, however, that different, standard and proprietary mail protocols such as the Interactive Mail Access Protocol (hereinafter "IMAP"), the Distributed Mail System Protocol (hereinafter "DMSP"), X.400, and Lotus Notes may be implemented without departing from the scope of the present invention.

Figure 4:
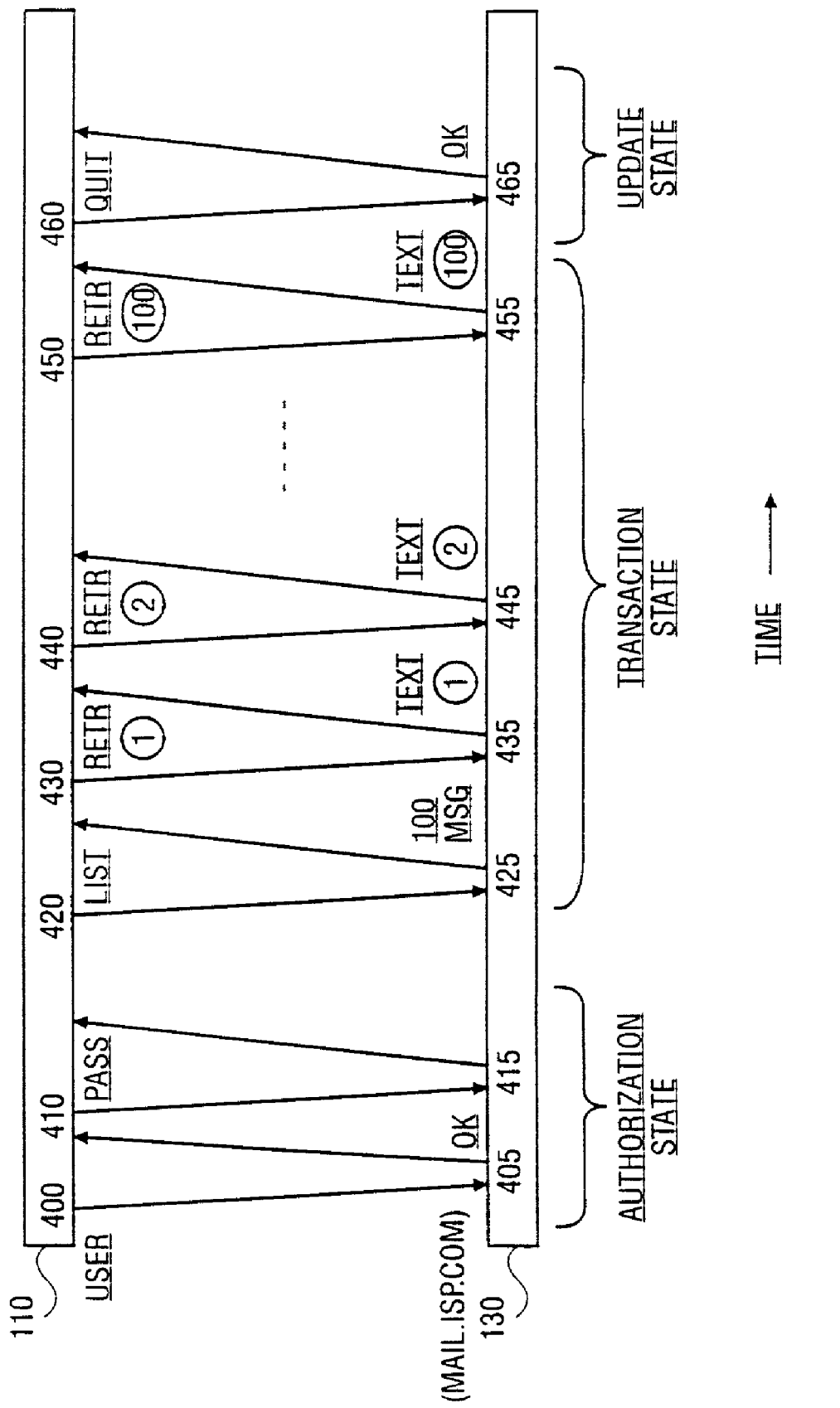
FIG. 4 is a signal diagram illustrating communication between a mail server and a client.

FIG. 4 is a signal diagram which illustrates the interaction between client 110 and mail server 130 using the POP3 protocol. The authorization state is comprised of user agent 115 sending client 130 a user name and password (at 400 and 410, respectively). Based on the user name and password, mail server 130 determines whether client 130 should be provided access to mailbox 140. If access is permitted (i.e., the submitted user name and password are correct) mail server 130 responds with a positive status indicator 415. The session then enters the transaction state.

In the transaction state user agent 115 sends mail server 130 a LIST command at 420. If there is new mail in mailbox 140, server 130 responds to the LIST command with the number of new messages —100 in the example (at 425). User agent 115 then retrieves the e-mail messages one at a time using a RETR command (starting at 430). Finally, after user agent has received all 100 messages, user agent 115 issues the QUIT command at 460 and the POP3 connection is terminated at 465. This final state is the referred to as the update state. During the update state mail server 130 updates mailbox 140 by removing all messages marked as deleted and releases its lock on mailbox 140.

If client 120 previously sent an e-mail message to client 110 as described above, client 120's e-mail will be one of the 100 messages retrieved from mail server 130. However, if client 120 is a spammer, sending client 110 an unwanted solicitation, client 110 will have wasted hard drive space, line access time/cost and personal time downloading the e-mail message. This inefficiency and waste becomes more significant if a substantial percentage of all 100 e-mail messages stored in mailbox 140 are spam. Moreover, if client 110 is communicating with mail server 130 through a modem dial-up connection (rather than over a LAN), the time and cost associated with downloading unwanted content is even more significant given the current speed limitations of modems (currently less than 56,000 bits/sec) and the access cost of ISPs. Accordingly, it would be beneficial to provide an e-mail filter to remove spam from mailbox 140 before time is wasted downloading and storing it.

Figure 2:
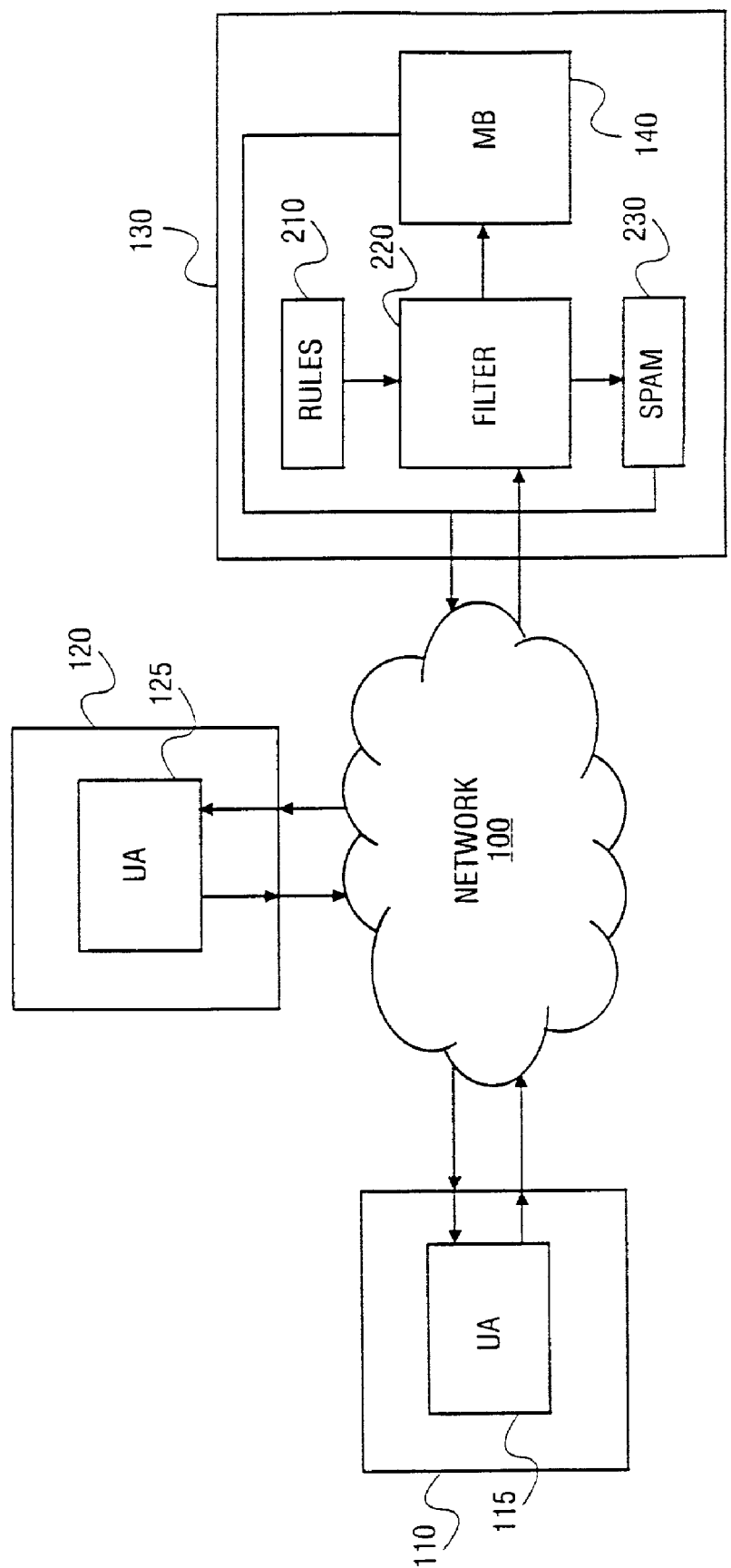
FIG. 2 illustrates the data network of FIG. 1 wherein an embodiment of the server of FIG. 1 includes an e-mail filter.

FIG. 2 illustrates one method for solving this problem. Mail server 130 of FIG. 2 includes an e-mail filter module 220, a plurality of anti-spam rules 210, mailbox 140, and a spam storage area 230. All incoming e-mail initially passes through filter module 220. Filter module 220 applies a set of rules 210 for detecting spam. Spam is then deposited in a spam storage area 230 while legitimate e-mail is sent through to mailbox 140. In an alternative embodiment, spam is initially stored in a mailbox and is subsequently filtered using filter module 220.

As set forth in co-pending application entitled "APPARATUS AND METHOD FOR CONTROLLING DELIVERY OF UNSOLICITED E-MAIL" (Ser. No. 08/997,692), rules 210 applied to filter module 210 may be established based on information collected using "spam probes." A spam probe is an e-mail address selected to make its way onto as many spam mailing lists as possible. It is also selected to appear high up on spammers' lists in order to receive spam mailings early in the mailing process (e.g., using the e-mail address "aardvark@aol.com" ensures relatively high placement on an alphabetical mailing list).

Spam collected from various spam probes is then analyzed and rules 210 are established based on this analysis. For example, in one embodiment, source header data from incoming e-mail is analyzed. If the network address contained in the source header is identified as the network address of a known spammer, a rule will be established to filter all incoming e-mail from this network address into the spam storage area 230. Rules 210 may also be established which identify spam based on a mathematical signature (e.g., a checksum) of the spam e-mail body (or portions of the e-mail body). Any incoming message which contains the identified signature will subsequently be forwarded into the spam storage area 230. Rules 210 based on keywords in the subject or body of spam e-mail may also be established. For example, all e-mails containing the two words "sex" and "free" may be identified as spam and filtered. In one embodiment, mail marked as potential spam is transferred to a control center where it is inspected (e.g., by a computer technician) before being sent to the spam storage area 230.

In addition, a dynamically updated inclusion list may be generated at server 130. The inclusion list initially screens e-mail header fields of all incoming e-mail messages. All messages that appear on the list are passed through to mailbox 140. E-mail received from sources other than those on the inclusion list are processed by additional anti-spam rules 210 as described herein. In one embodiment, the inclusion list is simply one of the plurality of rules 210 acting on filter module. In another embodiment, the inclusion list is a separate software module executing on server 130. The end result is the same regardless of which embodiment is used.

E-mail Filter API

Figure 7:
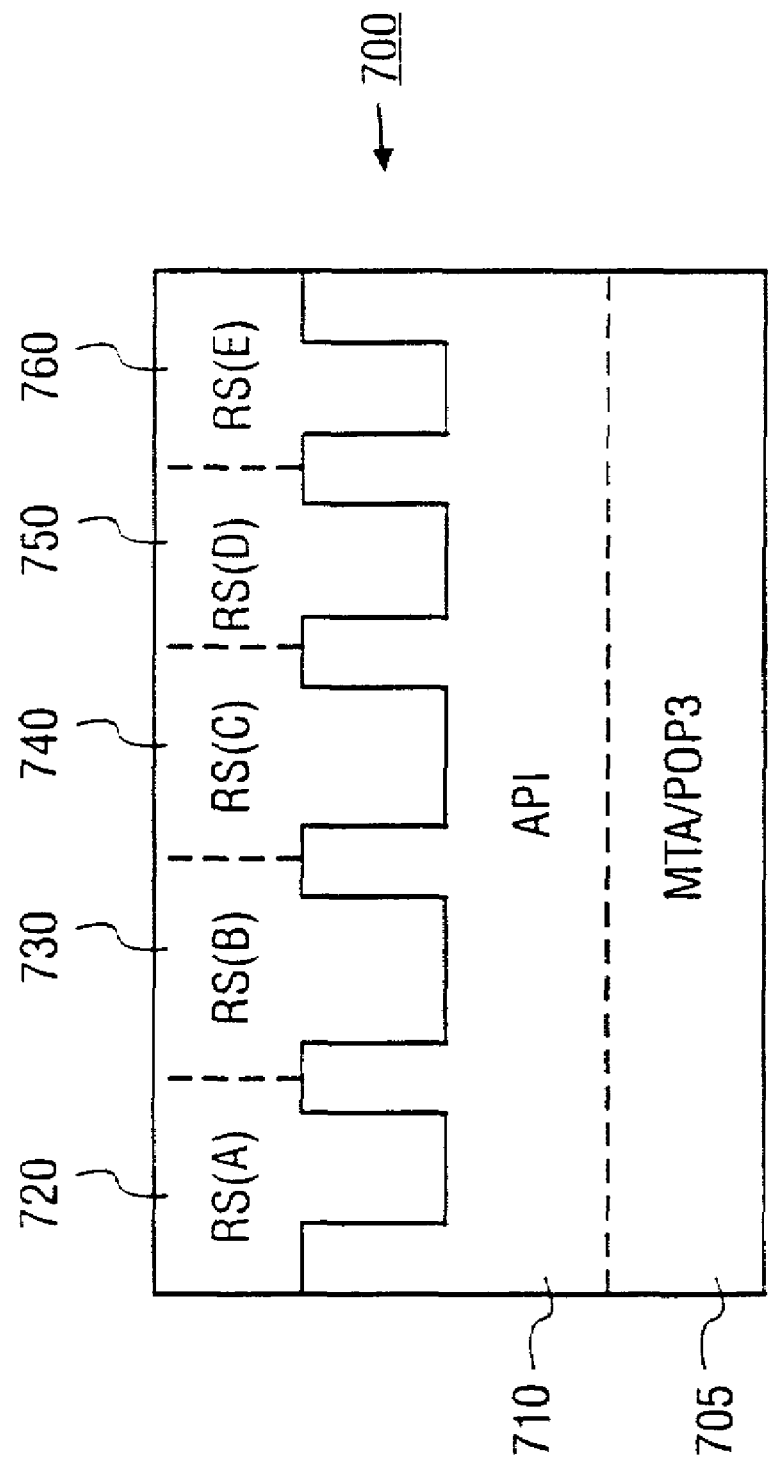
FIG. 7 is one embodiment of an e-mail filter.

Because spam is continuously being created and modified by spammers, a system is needed in which rules for filtering spam can be easily updated. In addition, an e-mail filtering system is needed which is easily modified to suit the unique preferences of individual e-mail users and which can be easily adapted to run on proprietary e-mail systems. To address these and other issues an improved filter module 700 is illustrated in FIG. 7. The improved filter module 700 includes an anti-spam application programming interface (hereinafter "API") 710 which runs on a message transfer agent (705) or other components of an e-mail transmission system including a POP3 server. As is known in the art, an API includes a plurality of subroutines which can be invoked by application software (i.e., software written to operate in conjunction with the particular API). Thus, in FIG. 7 rule handling filter modules 720, 730, 740, 750, and 760 are dynamically loaded into memory to meet the needs of new filtering or e-mail processing methods. The modules interface with API 710 by making calls to the API's set of predefined subroutines. In one embodiment, a portion of the API 710 subroutines and a set of prefabricated rule handling filter modules can be marketed as a Software Development Kit (hereinafter "SDK"). This will allow ISPs, corporations and/or end-users to customize the type of e-mail filtering which they require. In addition, because modules 720-760 are dynamically linked, they may be loaded and unloaded without having to shut down the application or reboot the system on which the filter module is executed.

Referring again to FIG. 7, in one embodiment, each one of the rule handling filter modules 720-760 filters spam based on different criterion. For example, filter module RS(A) 720 may filter spam based on a specific keyword search, whereas filter module RS(B) 730 may filter spam based on a mathematical signature (e.g., a checksum), RS(E) 760 may perform a virus check on incoming e-mail messages, and RS(C) 740 may be an inclusion list. Other contemplated rule handling filter modules will filter e-mail based on: (1) word or letter frequency analysis; (2) IP source frequency analysis; (3) misspelling analysis (unwanted e-mail often contains misspelled words); (4) word or letter combination analysis; (5) technical or legal RFC822 header compliance; and (6) feature extraction & analysis (e.g., based on phone numbers, URL's, addresses, etc.). It should be noted that all of the rule handling filter modules described herein may be combined or applied over a distributed array of filters throughout a network.

Referring again to FIG. 7, if a spammer makes a slight modification to his message in order to circumvent, for example, the mathematical signature module RS(B) 730, the module can be updated to include the new mathematical signature of the spammer's modified message without affecting the remaining modules. Thus, an improved filter module 700 is described which allows continuous, user-specific modifications to a plurality of rule modules 720-760.

It should be noted that the rule-based filtering method and apparatus described herein can be implemented at virtually any point along the e-mail transmission path from client 120 to server 130 to client 110. For example, on mail server 130 an embodiment of filter module 700 can be located at a point in server 130 where e-mail messages are transmitted to client 110 or at a point where the messages are received (as shown in FIG. 2). In an alternative embodiment, mail server 130 initially stores all incoming messages in a message store and periodically applies filter 700 to all message in the message store.

In addition, Client 110 can itself contain an embodiment of filter module 700. Therefore, Client 110 can apply filter module 700 periodically as described above (with reference to server 130) or, alternatively, can apply filter module 700 to all incoming e-mail messages. Filter module 700 can also be applied within a mail relay residing on network 100. In sum, filter module 700 may be applied at any node through which e-mail messages are transmitted.

Rule Aging and Weighting

In another embodiment, the rules 210 used by filter module 220 are continually monitored by server 130. If a rule has not been used to filter spam for a predetermined length of time (e.g., a month) that rule may be moved from an active to an inactive state and no longer applied to filter 220 (unless the type of spam for which it was created reappears). This type of rule-aging system is useful given the fact that older types of spam are continually replaced with new types. If not removed as described above, the number of outdated rules would build up an unmanageable level and filter module 220 may become inefficient at removing spam (applying numerous obsolete rules to the incoming e-mail stream).

Additionally, in one embodiment, rules applied to filter module 220 are weighted based on one or more variables, including but not limited to spam content, probability of positive spam identification, and frequency of use. For example, a rule which is geared towards screening e-mail messages containing sexual content (e.g., in a home where children use the computer) which filters e-mail based on the keywords "sex" and "free" may be given a weight value of 10 on a scale from 1 to 10. However, a rule which screens e-mail based merely on the keyword "free" may be weighted with, e.g., a weight value of 2.

E-mail messages can also be weighted based on the probability that the filter has correctly identified the filtered e-mail message as spam. For example, a positive spam identification under a mathematical analysis (e.g., a checksum) will generally be accurate. Thus, an e-mail message identified as spam based on a mathematical calculation will be given a higher weighted value than, for example, a keyword identification.

In addition, the rules applied to filter module 220 may be additive such that it may take several rules to fire to allow filter module 220 to decide that a message is spam. In such an embodiment, the relative weights of the rules which identify the message as spam can be added together to establish a cumulative weighted value. Moreover, a filter module 220 in this embodiment may be configured based on how aggressively filter module 220 should screen e-mail messages. For example, filter module 220 may configured to screen all e-mail messages with a cumulative weighted value of 6.

Rule Prioritization Based on Usage and Detection Accuracy

In one embodiment, rules have two weights associated with them: (1) a spam weight—this weight indicates the certainty that if a rule fires successfully against a message, the message is Spam and (2) a priority weight—this weight indicates the frequency of use and most recent use of a rule. In addition, in this embodiment two different priority weights may be associated with a rule, a global priority weight and a local priority weight.

Spam Weight is an arbitrary weight chosen by a rule designer based on internal heuristics to reflect the certainty that the rule will correctly identify Spam. General rules, for example, that don't definitively identify Spam but are designed to detect typical Spammer practices, may be provided lower weights that rules which target a specific type of spam. Thus, because of their low assigned weight, general rules may need to fire along with other rules (general or not) for spam to be filtered by filter module 700 (or 310, 850).

In this embodiment, new rules are assigned the highest Priority Weight. As statistics on rule usage are compiled, the priority weight may change to reflect how often the rule is used. For example, if a new rule is generated and isn't used within a configured period of time, the rule's priority weight will decrease. Similarly, if a rule has been used recently or frequently within a designated interval, the priority weight will be increased. Global priority weight reflects a rule's usage at all known filter modules across a network (e.g., network 100) whereas local priority weight reflects a rule's usage at a specific node (e.g., filter module 310).

The spam weight and priority weight of a set of rules may be combined mathematically to prioritize rules within the set. In one embodiment, the spam weight and priority weight of each rule within the set are multiplied together and the results of the multiplications are ordered sequentially. Those rules associated with numerically higher results (i.e., which are used more frequently and are more likely to correctly identify spam) are assigned higher priorities within the set.

Moreover, rules assigned higher priorities will tend to be executed earlier against messages applied to the filter module 310, resulting in a more efficient spam filtration system. In other words, spam will be identified more quickly because rules with a higher usage frequency and detection accuracy will be implemented first. In addition, both the Global and Local Priority weights may be multiplied with a rule's Spam Weight as described above to evaluate new orderings within the set of rules.

Proxy Server E-mail Filter

One problem associated with the implementation of filter modules 220 and 700 as described above is that in order for client 110 to receive the benefit of a server-side filter module 220, it must be set up and maintained by the administrator of server 130. For example, if the user of client 110 belongs to an online service—say, for example, Netcom®—that user will not be able to implement a server-side filter if Netcom does not provide one. Moreover, assuming arguendo that Netcom offers a server-side e-mail filter, the user of client 110 will be limited to the type of filter offered. If the filter is merely a static filter, the user will not be able to significantly tailor it to his specific preferences.

Figure 3:
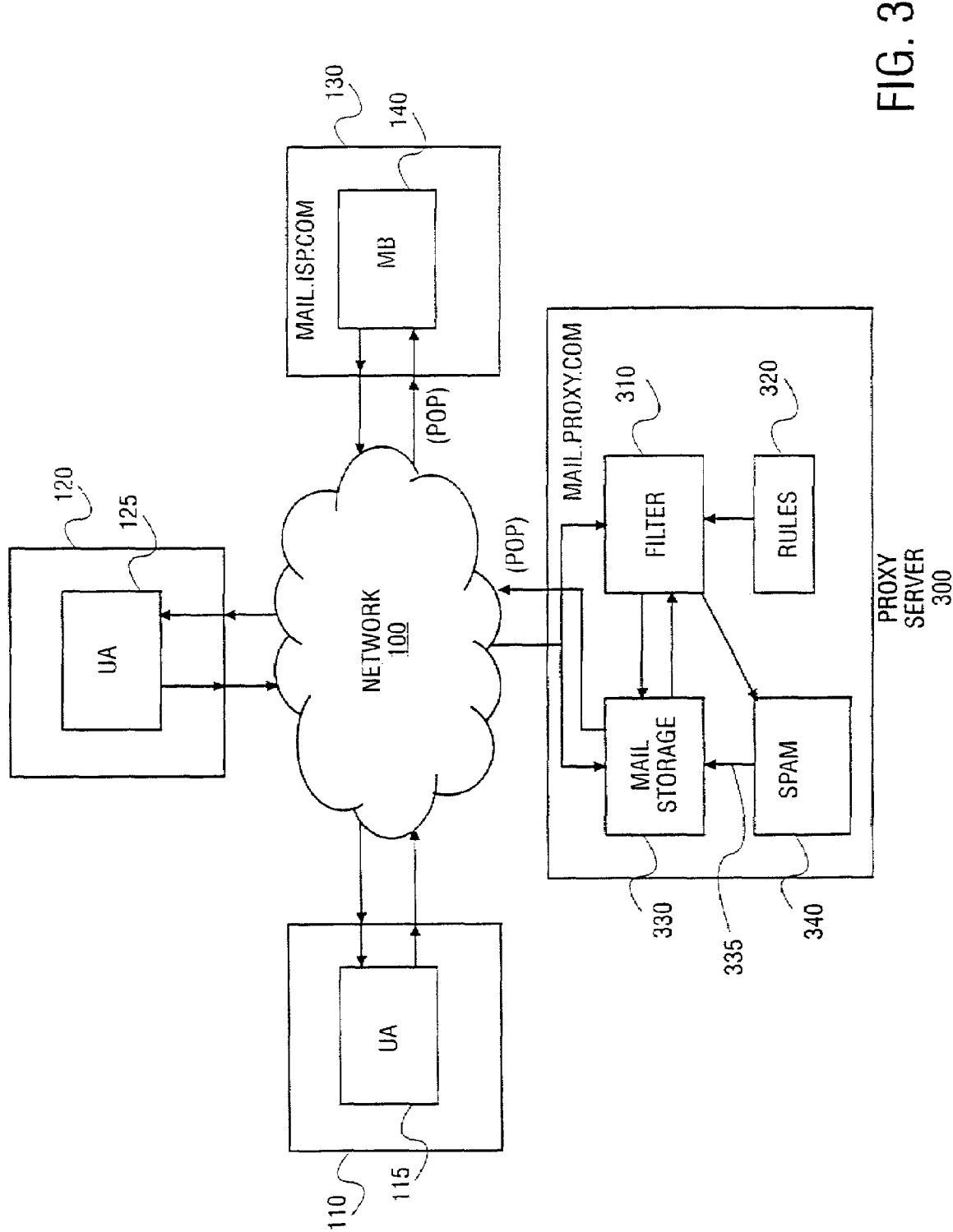
FIG. 3 illustrates the data network of FIG. 1 including a proxy server used to filter e-mail.

As described above, user agent 115 executed on client 110 allows client 110 to check for e-mail in mailbox 140 on mail server 130. E-mail user agents known in the art include Microsoft Outlook®, Lotus cc:mail®, Lotus Notes®, Novell Groupwise®, Eudora®, and Netscape Communicator®. In order for any one of these user agents to retrieve mail from mailbox 140 on mail server 130, the user agent must be configured with the correct network address (e.g., "mail.isp.com" as shown in FIG. 3) and the correct mail protocol (e.g., POP3 in our example). If configured properly, user agent 115 will initially send a user name and password to open communication with mail server 130 "mail.isp.com" during the POP3 authentication stage (as described in detail above with reference to FIG. 4).

FIG. 3 illustrates one embodiment of the present system and method in which a proxy server 300 is used to retrieve and filter e-mail initially stored in mailbox 140. Proxy server 300 is comprised of a mail storage module 330, a filter module 310, a spam storage area 340 and a plurality of rules 320. In this embodiment, user agent can be reconfigured so that e-mail is no longer received directly from mailbox 140. Rather, e-mail will first be transferred through filter module 310 in proxy server 300 to be filtered before being transferred to user agent 115. In one embodiment, this is accomplished by changing the mail server address listed in user agent 115 from "mail.isp.com" to the network address of the proxy server, "mail.proxy.com."

Figure 5:
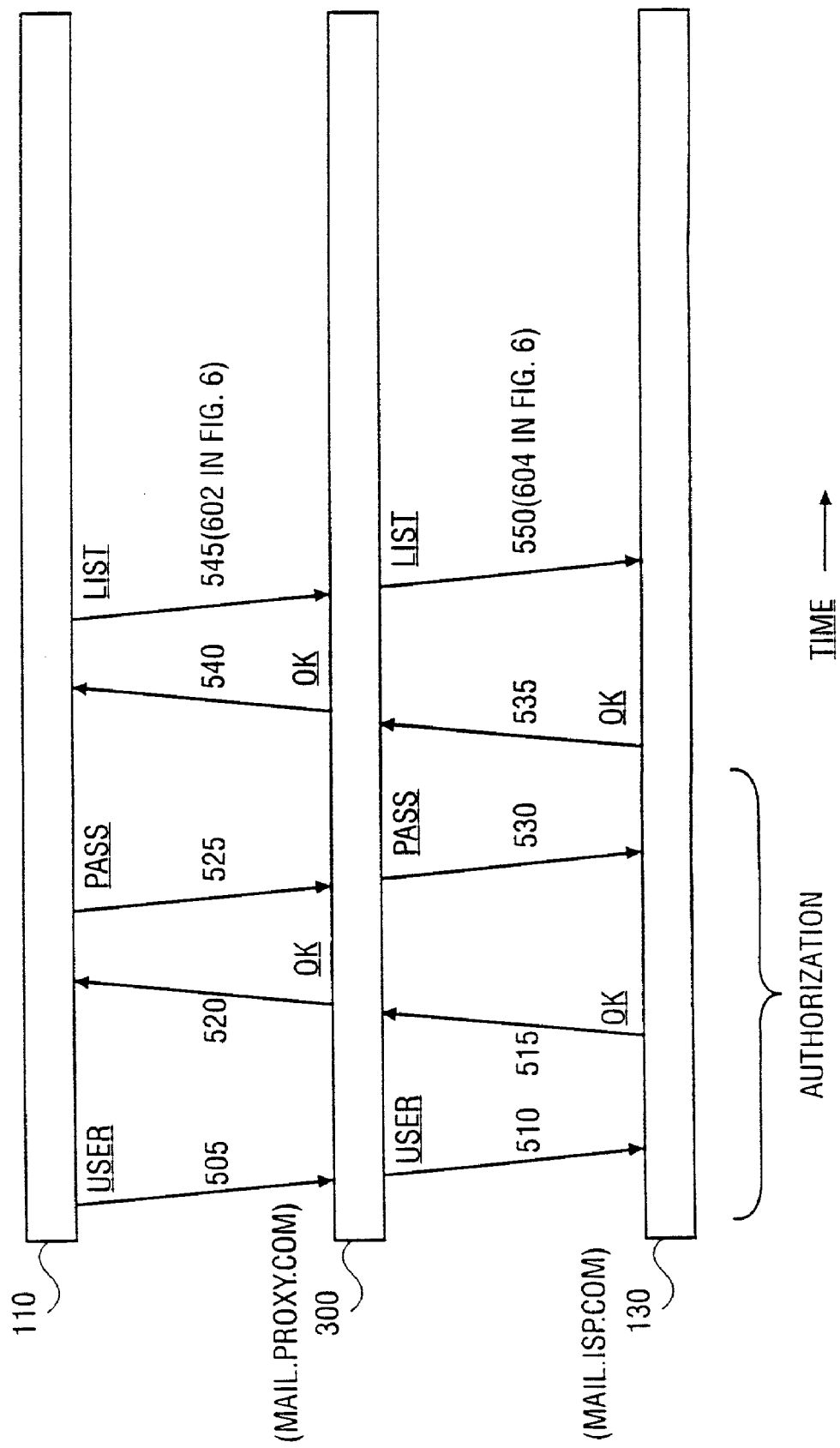
FIG. 5 is a signal diagram illustrating communication between a client, a proxy server, and a mail server.

Thus, referring now to FIG. 5 as well as FIG. 3, when user agent 115 is executed, it initially sends its user name to "mail.proxy.com," rather than "mail.isp.com" where its mailbox resides (signal 505). Proxy server 300 then communicates the user name to mail server 130 on behalf of client 110 (signal 510). Once mail server 130 responds with a positive indication (signal 515) proxy server 300 passes on the response to client 110 (signal 520). Client then transmits a password associated with the user name to proxy server 300. Once again, proxy server 300 forwards this information to mail server 130 on behalf of client 110 (signal 530) and forwards the response from mail server 130 (signal 535) on to client 110 (signal 540). In another embodiment, proxy server requests both the password and the user name from client 130 before initiating contact with mail server 130.

Figure 6:
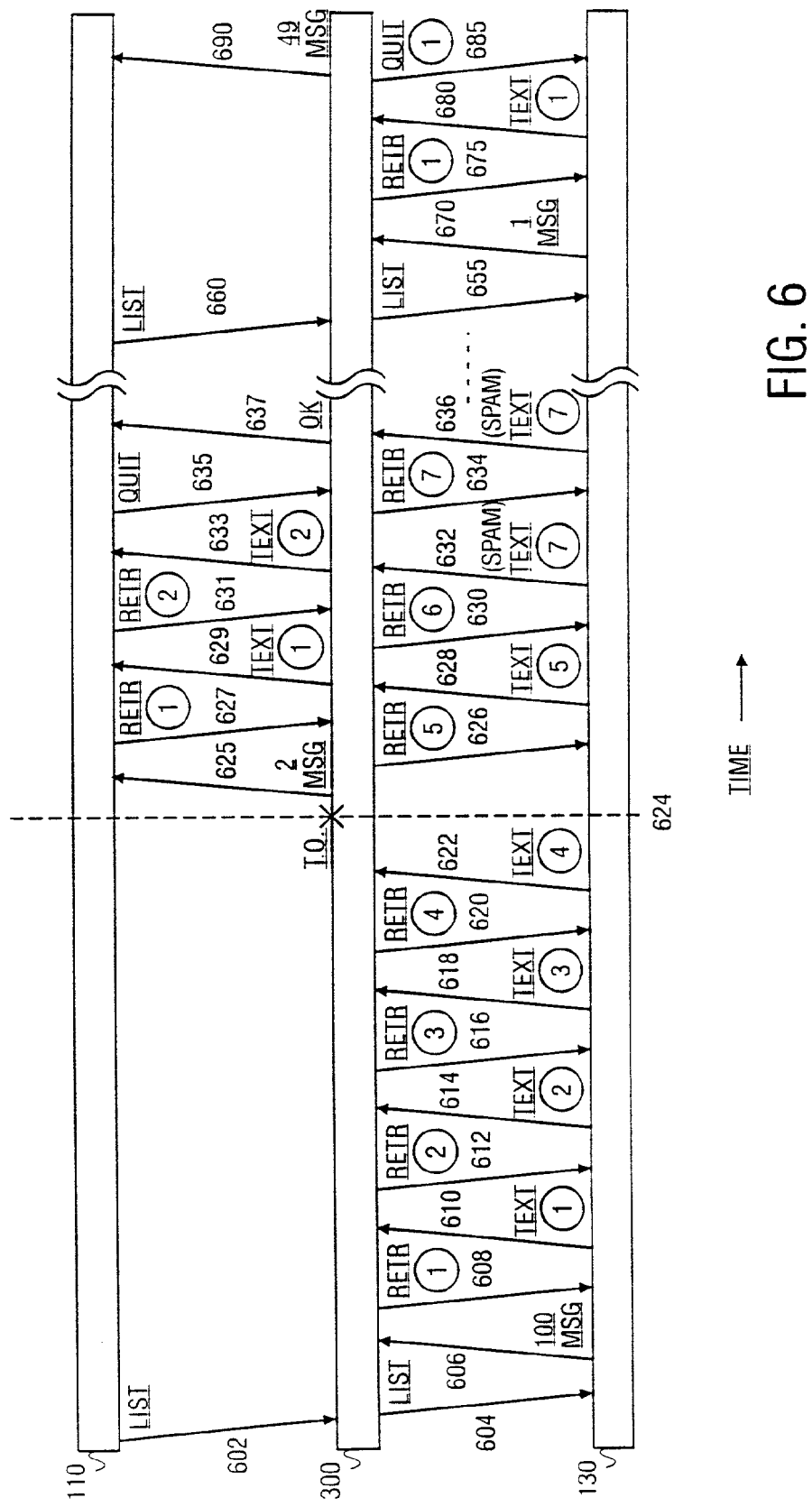
FIG. 6 is a signal diagram illustrating communication between a client, a proxy server, and a mail server.

Referring now to FIG. 6, client 110 sends a LIST command to proxy server 300 (signal 602), requesting a list of current e-mail messages, and proxy server 300 forwards the command to mail server 130 (signal 604) on behalf of client 110. In response to the list signal, mail server 130 sends a response to proxy server that there are currently 100 messages stored in mailbox 140 (signal 606). Proxy server then begins retrieving each of the 100 messages, starting with the RETR(1) signal 608 to retrieve message 1. Upon receiving message 1 (signal 610) proxy server 300 applies filter module 310 to the incoming message to determine whether message 1 is spam or legitimate e-mail. In one embodiment, filter module 310 also scans message 1 for computer viruses and processes message 1 accordingly. If message 1 is legitimate, it is stored in mail storage module 330 (to be subsequently transferred to client 110). However, if message 1 is spam, it is filtered into spam storage module 340. Similarly, if message 1 contains a computer virus, it can be filtered into a virus storage module (not shown).

In one embodiment, client 115 may send a request to proxy server 300 to view messages which have been filtered into spam storage module 340 (or into a virus storage module). Client 110 can then insure that legitimate messages have not been inadvertently filtered by filter module 310. As such, in this embodiment, proxy server 300 will store spam in spam storage module 340 for a predetermined length of time. Alternatively, client 115 may be allocated a predetermined amount of memory in spam storage module 340. When this memory has been filled up with spam, the oldest spam messages will be forced out to make room for new spam messages. In addition, client 110 may be periodically notified that spam has been filtered into spam storage module 340. Once client 110 has checked spam storage area 340 to view messages which have been filtered, the user may choose to redirect one or more filtered messages back into mail storage module 330 (illustrated as signal 335 of FIG. 3). Once this decision has been made, the user may modify one or more rule based filter modules 320 to ensure that this "type" of e-mail message is no longer filtered.

Proxy server 300 continues to retrieve messages from mail server 130 one at a time (signals 612 et seq.) until the last message—e.g., message 100 (not illustrated in FIG. 6)—has been retrieved. Filter module 310 applies its set of rules 310 to identify spam, computer viruses or other types of e-mail messages and sorts the retrieved messages accordingly. In the embodiment illustrated in FIG. 3 e-mail is filtered into either spam storage module 340 or mail storage module 330.

At some predetermined point in time (represented by the dashed line 624 in FIG. 6) client 110 will require a response from proxy server 300. In one embodiment, this time period 624 (hereinafter "timeout period") is based on how long user agent 115 on client 110 will wait for a mail server response before timing out (and possibly issuing an error message to the user). In another embodiment, the timeout period 624 is determined by how long a typical user will tolerate waiting for an initial response from his/her mail server. Regardless of how the timeout period 624 is calculated, once it has been reached, proxy server 300 transfers all legitimate e-mail messages which have been processed (i.e., messages which have been identified as non-spam and virus-free by filter module 310 and transferred to mail storage module 330) to client 110.

In the signal diagram shown in FIG. 6, timeout period 624 is reached after proxy server 300 has processed 4 of the 100 e-mail messages from mail server 130. Of these four messages, messages 2 and 3 (signals 614 and 618) have been identified as spam and transferred to spam storage area 340. Messages 1 and 4 (signals 610 and 622), however, have been identified as legitimate. Thus, following timeout period 624, only legitimate messages 1 and 4 are presented to user agent 115 in response to user agent 115's LIST command (presented as messages 1 and 2). In response, client retrieves messages 1 and 4 (identified by client 110 as messages 1 and 2) from mail storage module 330 on proxy server 300 (signals 627 through 633). Client 110 then sends the QUIT command (signal 635) and ends the e-mail retrieval session with proxy server 300.

Following timeout period 624, however, proxy server 300 continues retrieving and processing the 96 e-mail messages remaining on mail server 130 as described above. At some point after proxy server has completed processing the remaining 96 messages, user agent 115 on client 110 sends another LIST command to proxy server 300, thereby requesting a list of current e-mail messages (signal 660). At this point, proxy server 300 has processed the 96 additional e-mail messages following timeout period 624. For the purposes of the following discussion it will be assumed that ½ of the 96 messages processed after timeout period 624 were identified as spam by filter module 310. Thus, by the time client 130 sends LIST signal 660, filter module 310 has transferred 48 messages into spam storage module 340 and 48 messages into mail storage module 330.

Upon receiving the LIST signal 660 from client 110, proxy server 300 sends a second list signal 665 to mail server 130 to determine whether additional e-mail messages addressed to client have been received at mailbox 140 since proxy server 300 and mail server 130 last communicated. In the example illustrated in FIG. 6, server 130 sends signal 670 indicating that one additional message has been received during this period. Accordingly, proxy server 300 retrieves the additional e-mail message (signals 675 and 680) and determines that it is legitimate by passing it through filter module 310. Proxy server 300 then terminates communication with mail server 130 by issuing the QUIT command (signal 685).

Thus, in response to client 110's LIST command 660, proxy server 300 sends a response signal 690 indicating that 49 e-mail messages are currently available, all of which are legitimate e-mail messages. Client 110 will subsequently proceed to retrieve each of the 49 remaining messages from mail storage module 330 on proxy server 300 (although these signals are not illustrated in the signal chart of FIG. 6). The end result is that client 110 only downloads legitimate e-mail and thereby conserves time, access cost, and hard drive space. In addition, client 110 is able to implement the current system and method without modifying his ISP account, online service provider account or corporate mail server account (all of which are represented by mail server 130). In other words, because proxy server 300 sends the user name and password of client 110 to mail server 130, mail server 130 assumes that it is client 130 connecting in to retrieve mail. As such, no modification is required to client 110's account on mail server 130.

In one embodiment, proxy server 300 will store cleaned e-mail messages in mail storage module 330 even after the messages have been downloaded by client 110. This is done so that the messages do not have to be filtered a second time if client 110 need to access the messages again (e.g., if the user of client 110 attempts to check e-mail from a different computer).

Figure 8:
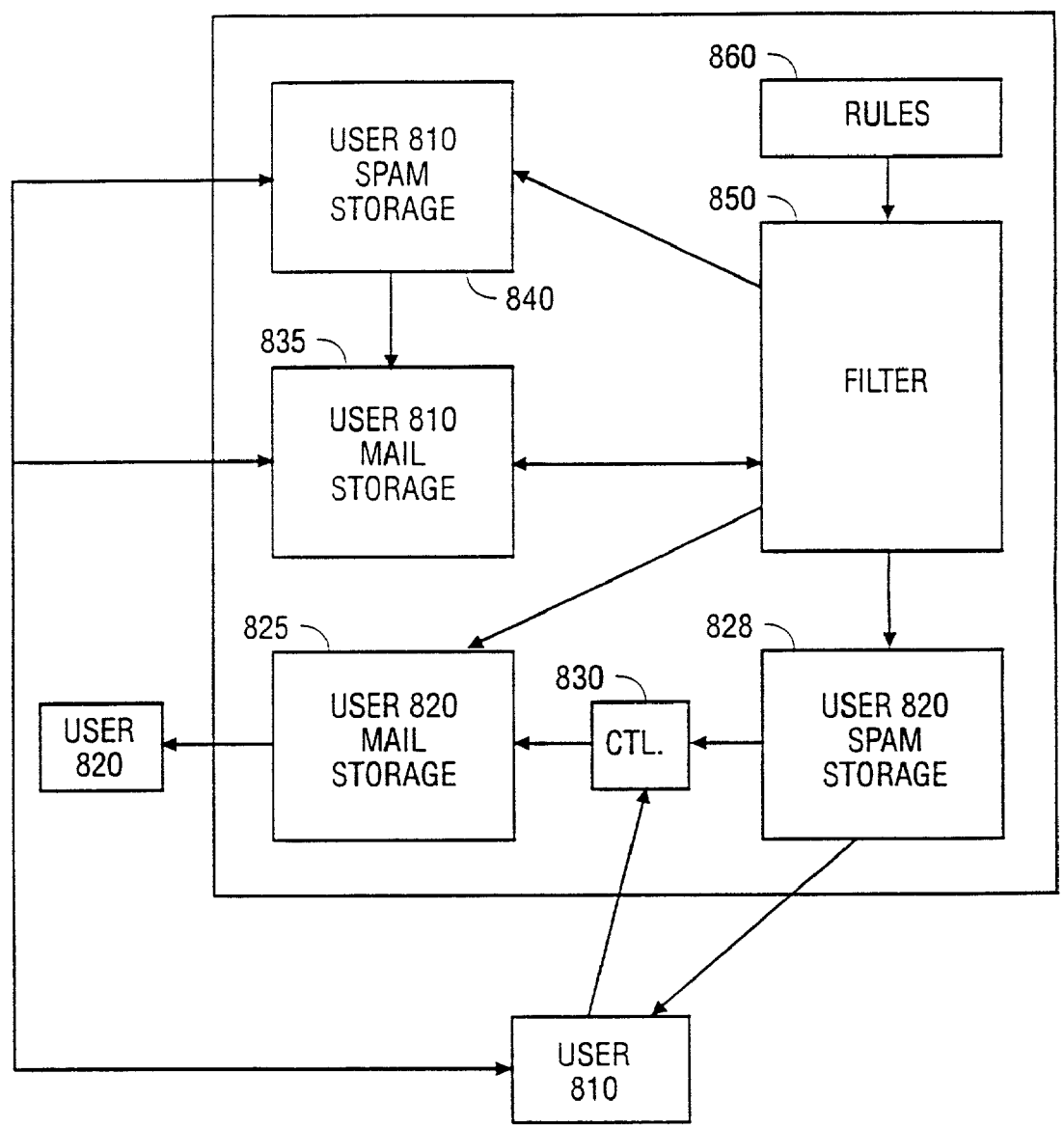
FIG. 8 is one embodiment showing two or more user accounts established on a server or a proxy server.

Referring now to FIG. 8, in one embodiment, two or more user accounts may be established on server 130 (FIG. 2) or proxy server 300 (FIG. 3) such that one user reviews the filtered e-mail of another user. Thus, user 810 is assigned a personal mail storage area 835 which contains e-mail messages which have passed through filter module 850 (and have been identified as legitimate). User 810 also has access to a personal spam storage area 840 which contains e-mail messages identified as spam by filter module 850. In addition, user 810 can view messages stored in a spam storage area 828 assigned to user 820 and select (via control unit 830) messages to pass through to user 820's mail storage 825. Thus, in this embodiment user 810 may be a parent who sets filter module 850 to aggressively filter messages (i.e., to trigger at a low threshold as described above) addressed to his/her child (user 820). User 810 can then review the messages before allowing the child (user 820) to access the messages. Alternatively, user 810 may be a corporate network administrator reviewing filtered messages for an employee 820 to determine whether the filtered messages have been filtered correctly.

In another embodiment, once a particular e-mail message has been identified as spam, only a single copy of that message is stored in spam storage module 340, regardless of how many different e-mail users the message is addressed to. This technique of caching only one copy of a spam message in spam storage module 340 allows proxy server 300 to conserve significant space in spam storage area 340 given the fact that spam is commonly distributed to thousands of e-mail users at a time.

One of ordinary skill in the art will readily recognize from the following discussion that alternative embodiments of the structures and methods illustrated herein may be employed without departing from the principles of the invention. Throughout this detailed description, numerous specific details are set forth such as specific mail protocols (i.e., POP3) and filter applications (e.g., spam removal) in order to provide a thorough understanding of the present invention. It will be appreciated by one having ordinary skill in the art, however, that the present invention may be practiced without such specific details. In other instances, well known software-implemented communication techniques have not been described in detail in order to avoid obscuring the subject matter of the present invention. The invention should, therefore, be measured in terms of the claims which follow.

What is claimed is:

1. A method for filtering e-mail messages comprising:
a computer system maintaining a set of filtering rules having one or more weight values associated therewith, wherein each of said filtering rules is configured to identify e-mail message characteristics indicative of spam; and
the computer system dynamically changing said set of filtering rules, including adding rules based upon spam e-mail messages addressed to one or more probe e-mail addresses, wherein the probe e-mail addresses are e-mail addresses created to receive spam e-mail messages, and further including aging a filtering rule from the set of filtering rules based on a weight value, the weight value reflecting a frequency of usage of the filtering rule within a designated time interval.

2. The method of claim 1 wherein aging the filtering rule comprises assigning an inactive status to the filtering rule.

3. The method of claim 1 wherein the weight value reflects the frequency of usage of the filtering rule across a network over which the e-mail messages are received.

4. The method of claim 1 wherein the weight value reflects the frequency of usage of the filtering rule at a specific network node of a network over which the e-mail messages are received.

5. An apparatus for filtering e-mail messages comprising:
a data storeconfigured to maintain a set of filtering rules having one or more weight values associated therewith, each of said filtering rules configured to identify e-mail message characteristics indicative of spam;
a processor; and
a memory storing program instructions executable by the processor to implement:
a filter module configured to dynamically change said set of filtering rules, including adding rules based upon spam e-mail messages addressed to one or more probe e-mail addresses, wherein the probe e-mail addresses are e-mail addresses created to receive spam e-mail messages, and further including aging a filtering rule from the set of filtering rules based on a weight value, the weight value reflecting a frequency of usage of the filtering rule within a designated time interval;
a filter module configured to age a filtering rule from the set of filtering rules based on a weight value, the weight value reflecting a frequency of usage of the filtering rule within a designated time interval;

6. The apparatus of claim 5 wherein aging the filtering rule comprises assigning an inactive status to the filtering rule.

7. The apparatus of claim 5 wherein the weight value reflects the frequency of usage of the filtering rule across a network over which the e-mail messages are received.

8. The apparatus of claim 5 wherein the weight value reflects the frequency of usage of the filtering rule at a specific network node of a network over which the e-mail messages are received.

9. An apparatus for filtering e-mail messages comprising:
first hardware means for maintaining a set of filtering rules having one or more weight values associated therewith, wherein each of said filtering rules is configured to identify e-mail message characteristics indicative of spam; and
second hardware means for dynamically changing said set of filtering rules, including adding rules based upon spam e-mail messages addressed to one or more probe e-mail addresses, wherein the probe e-mail addresses are e-mail addresses created to receive spam e-mail messages, and further including aging a filtering rule from the set of filtering rules based on a weight value, the weight value reflecting a frequency of usage of the filtering rule within a designated time interval.

10. The apparatus of claim 9 wherein the second hardware means for aging comprise means for assigning an inactive status to the filtering rule.

11. The apparatus of claim 9 wherein the weight value reflects the frequency of usage of the filtering rule across a network over which the e-mail messages are received.

12. The apparatus of claim 9 wherein the weight value reflects the frequency of usage of the filtering rule at a specific network node of a network over which the e-mail messages are received.

13. A method comprising:
a computer system receiving e-mail messages addressed to a client;
the computer system filtering the e-mail messages based on one or more rules to produce one or more filtered e-mail messages, the rules being dynamically established utilizing sample e-mail messages retrieved from one or more probes and aged based on frequency of use, the one or more probes representing fictitious e-mail addresses created to appear on spam e-mail mailing lists and to receive sample spam e-mail messages; and
the computer system providing the client with the filtered e-mail messages.

14. The method of claim 13 wherein the e-mail messages are filtered based on information in the e-mail message header.

15. The method of claim 13 wherein the e-mail messages are filtered based on the address from which the e-mail messages originate.

16. The method of claim 13 wherein the e-mail messages are filtered based on keywords within the e-mail messages.

17. The method of claim 13 wherein the e-mail messages are filtered based on a mathematical signature of the e-mail messages.

18. The method of claim 13 wherein the e-mail messages are filtered based on whether the e-mail messages contains computer viruses.

19. The method of claim 13 wherein the e-mail messages are filtered based on an inclusion list.

20. The method of claim 13 wherein filtering is performed by a filter module comprised of an application programming interface ("API") and one or more dynamically linked rule modules.

21. A method comprising: a proxy server receiving, from a mail server, e-mail messages addressed to a client; the proxy server filtering spam e-mail messages from received the e-mail messages based on one or more rules to produce one or more filtered e-mail messages, the rules being dynamically established utilizing sample spam e-mail messages and aged based on frequency of use of the rules; and the proxy server providing the filtered e-mail messages to the client.

22. The method of claim 21 wherein the e-mail messages are filtered based on information in e-mail message headers.

23. The method of claim 21 wherein the e-mail messages are filtered based on the address from which the e-mail messages originate.

24. The method of claim 21 wherein the e-mail messages are filtered based on keywords within the e-mail messages.

25. The method of claim 21 wherein the e-mail messages are filtered based on a mathematical signature of the e-mail messages.

26. The method of claim 21 wherein the e-mail messages are filtered based on whether the e-mail messages contains computer viruses.

27. The method of claim 21 wherein the e-mail messages are filtered based on an inclusion list.

28. The method of claim 21 wherein said filtering is performed by a filter module comprised of an application programming interface ("API") and one or more dynamically linked rule modules.

29. The method of claim 21 wherein the sample spam e-mail messages are received by at least one fictitious probe e-mail address selected to appear on spam e-mailing lists.

30. A machine-readable memory medium containing instructions which, when executed by a processing system, cause the processing system to perform a method, the method comprising: receiving e-mail messages addressed to a client; filtering the e-mail messages based on one or more rules to produce one or more filtered e-mail messages, the rules being dynamically established utilizing sample e-mail messages retrieved from one or more probes and aged based on frequency of use, the one or more probes representing fictitious e-mail addresses designed to appear on spam e-mail mailing lists and to receive sample spam e-mail messages; and providing the client with the filtered e-mail messages.

31. The machine-readable memory medium of claim 30, wherein the e-mail messages are filtered based on keywords within the e-mail messages.

32. The machine-readable memory medium of claim 30, wherein filtering is performed using an application programming interface ("API") and one or more dynamically linked rule modules.

33. A first computer system, comprising:
a processor;
a memory storing program instructions executable by the processor to: maintain a set of filtering rules for e-mail messages, each of the set of filtering rules having one or more weight values associated therewith, and wherein each of the set of filtering rules is configured to identify e-mail message characteristics indicative of spam; and
dynamically change the set of filtering rules, including adding rules based upon spam e-mail messages addressed to one or more probe e-mail addresses, the probe e-mail addresses comprising e-mail addresses designed to receive the spam e-mail messages, and further including aging a filtering rule from the set of filtering rules based on a corresponding weight value, the weight value reflecting a frequency of usage of the filtering rule within a designated time interval.

34. The first computer system of claim 33, wherein the program instructions are executable by the processor to age a first filtering rule by assigning it an inactive status.

35. The first computer system of claim 33, wherein the corresponding weight value for a first filtering rule reflects the frequency of usage of the first filtering rule across a network over which the e-mail messages are received.

36. The first computer system of claim 33, wherein the corresponding weight value for a first filtering rule reflects the frequency of usage of the first filtering rule at a specific network node of a network over which the e-mail messages are received.

37. The first computer system of claim 33, wherein the program instructions are further executable by the processor to apply the maintained set of filtering rules to a received set of e-mail messages, and to provide the unfiltered e-mail messages to a second computer system.

38. The first computer system of claim 37, wherein the first computer system is a proxy server.

39. A first computer system, comprising: a processor; a memory storing program instructions executable by the processor to: receive e-mail messages addressed to a client, wherein the e-mail messages are received from a mail server; filter spam e-mail messages from the received e-mail messages based on one or more rules to produce one or more filtered e-mail messages, the rules being dynamically established utilizing sample spam e-mail messages and aged based on frequency of use of the rules; and provide the filtered e-mail messages to the client; wherein the first computer system is a proxy server.

40. The first computer system of claim 39, wherein the e-mail messages are filtered based on information in e-mail message headers.

41. The first computer system of claim 39, wherein the e-mail messages are filtered based on addresses from which the e-mail messages originate.

42. The first computer system of claim 39, wherein the e-mail messages are filtered based on keywords within the e-mail messages.

43. The first computer system of claim 39, wherein the e-mail messages are filtered based on mathematical signatures of the e-mail messages.

44. The first computer system of claim 39, wherein the e-mail messages are filtered based on whether the e-mail messages contain computer viruses.

45. The first computer system of claim 39, wherein the e-mail messages are filtered based on an inclusion list.

46. The first computer system of claim 39, wherein the e-mail messages are filtered using an application programming interface ("API") and one or more dynamically linked rule modules.

47. The first computer system of claim 39, wherein the sample spam e-mail messages are received by at least one fictitious probe e-mail address created to appear on spam e-mailing lists, and wherein the one or more rules are applied to a given received e-mail message based on an order determined by weights associated with the rules.

48. The first computer system of claim 47, wherein the e-mail messages are filtered using an application programming interface ("API") and one or more dynamically linked rule modules.

49. One or more computer-readable memory media storing program instructions executable by a first computer system to: maintain a set of filtering rules for e-mail messages, each of the set of filtering rules having one or more weight values associated therewith, and wherein each of the set of filtering rules is configured to identify e-mail message characteristics indicative of spam; and dynamically change the set of filtering rules, including adding rules based upon spam e-mail messages addressed to one or more probe e-mail addresses, wherein the probe e-mail addresses are e-mail addresses created to receive the spam e-mail messages, and further including aging a filtering rule from the set of filtering rules based on a corresponding weight value, the weight value reflecting a frequency of usage of the filtering rule within a designated time interval.

50. The computer-readable memory media of claim 49, wherein the program instructions are executable to age a first filtering rule by assigning it an inactive status.

51. The computer-readable memory media of claim 49, wherein the corresponding weight value for a first filtering rule reflects the frequency of usage of the first filtering rule across a network over which the e-mail messages are received.

52. The computer-readable memory media of claim 49, wherein the corresponding weight value for a first filtering rule reflects the frequency of usage of the first filtering rule at a specific network node of a network over which the e-mail messages are received.

53. The computer-readable memory media of claim 49, wherein the program instructions are executable to apply the maintained set of filtering rules to a received set of e-mail messages, and to provide the unfiltered e-mail messages to a second computer system.

* * * * *